United States Patent [19]

Clough

[11] Patent Number: 5,105,849

[45] Date of Patent: Apr. 21, 1992

[54] BODY RELIEF VALVE FLAP

[75] Inventor: Melvyn J. L. Clough, Rochester Hills, Mich.

[73] Assignee: TRW Inc., Cleveland, Ohio

[21] Appl. No.: 763,926

[22] Filed: Sep. 23, 1991

[51] Int. Cl.⁵ .............................................. F16K 15/14
[52] U.S. Cl. ............................ 137/512.15; 137/512.3; 137/855; 454/162
[58] Field of Search ......................... 98/2.18, 119; 137/512.1, 512.15, 512.3, 855, 857

[56] References Cited

U.S. PATENT DOCUMENTS

| | | |
|---|---|---|
| 1,083,789 | 1/1914 | Alexanderson . |
| 3,405,968 | 10/1968 | Feles et al. . |
| 3,858,605 | 1/1975 | Bauer et al. . |
| 3,896,847 | 7/1975 | Bauer et al. . |
| 4,449,549 | 5/1984 | Weck . |
| 4,567,816 | 2/1986 | Kolt . |
| 4,574,835 | 3/1986 | Williams . |
| 4,667,578 | 5/1987 | Hagenah . |
| 4,781,106 | 11/1988 | Frien . |
| 4,972,765 | 11/1990 | Dixon . |

Primary Examiner—Robert G. Nilson
Attorney, Agent, or Firm—Fay, Sharpe, Beall, Fagan, Minnich & McKee

[57] ABSTRACT

A valve for use in ventilation of the passenger compartment of a motor vehicle comprises a housing defining a plurality of through flow passages with separate flap valve elements pivotally mounted adjacent each through flow passage. The valve elements are adapted in a first position to overlie the associated through flow passage for blocking flow, but when pivoted toward a second position, they open to permit flow. The flap valve elements are each pivotally mounted by separate hinges which act to bias the valve elements toward the first position with a preselected force. The hinges on separate ones of the flap valve elements are arranged to provide different preselected biasing forces such that the number of valve elements moving toward the open position at any point in time depends upon the then current level of pressure of fluid on the upstream side of the valve.

13 Claims, 2 Drawing Sheets

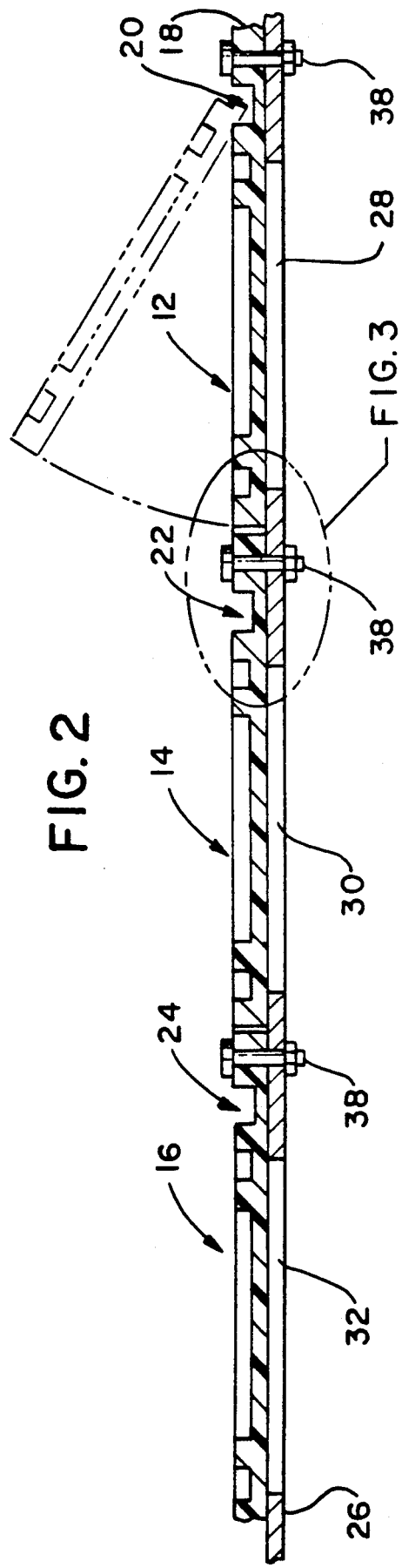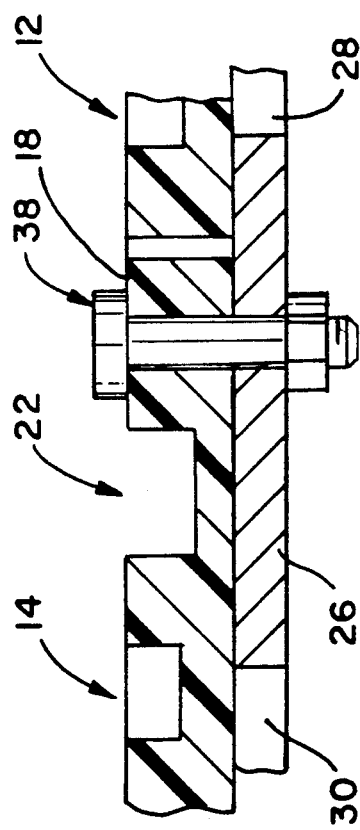

BODY RELIEF VALVE FLAP

BACKGROUND OF THE INVENTION

The subject invention is directed toward the art of pressure relief valves and, more particularly, to a flap type valve structure capable of variable valving to satisfy different pressure relief demands.

The invention is especially suited for use in motor vehicle ventilation systems and will be described with particular reference thereto; however, the invention is capable of broader application and could be used to provide variable pressure relief valving in many different systems.

The passenger compartments of motor vehicles must generally be provided with pressure relief valves to relieve the pressure within the compartment and to permit the exhausting of air to the exterior while preventing the undesired reverse flow of air to the interior. The typical relief valve is a flap valve mechanism wherein a flap of flexible material is suspended in a frame and rests by gravity in a closed position against a valve seat frame.

The positioning of the flap relative to the seat is such that it acts like a check valve and can open only when compartment pressure is in excess of exterior pressure by a certain minimum. When there is a relatively low constant pressure relief requirement such as is produced by a ventilating system blower, the typical prior art valves function adequately. However, when there is a high internal pressure pulse, such as results when a door is slammed shut, it would be desirable to have the valves provide a significantly higher and variable discharge rate.

BRIEF STATEMENT OF THE INVENTION

The subject invention provides a relief valve structure which is extremely simple and assures a variable discharge rate. The flow area available for discharge of compartment area can vary directly with the upstream pressure.

In accordance with the invention, the valve comprises a housing defining a plurality of through flow passages with separate flap valve elements pivotally mounted adjacent each through flow passage. The valve elements are adapted in a first position to overlie the associated through flow passage to block flow therethrough. When pivoted toward a second position, the valve elements permit fluid flow. According to the invention, each of the separate flap valve elements are pivotally mounted by separate hinge assemblies which act to bias the valve elements toward the first position with a preselected force. The hinge assemblies on separate ones of the flap valve elements are arranged to provide different preselected biasing forces such that the number of valve elements moving toward the second position at any point in time depends upon the then current level of fluid pressure on the downstream side. As is apparent, this allows the valve to open to permit greater flows when there is an upstream pressure surge.

Preferably, and in accordance with a more limited aspect of the invention, the valve flaps and hinge assemblies are formed from elastomeric material with the hinge assemblies comprising webs of elastomeric material of predetermined different thicknesses on different ones of the valve elements.

In accordance with a further aspect of the invention, the webs of elastomeric material forming the hinge assemblies are preferably formed integrally with the flap valve elements.

According to another aspect of the invention, the entire structure of flap valve elements, hinge assemblies, and frame can, if desired, be injection molded as a single unitary structure for installation in the ventilation system of a motor vehicle.

By merely changing the relative thicknesses of the hinge assemblies of the different flap valve elements, the pressures at which the valve open can be made to vary in any preselected manner. Additionally, by varying the area of the individual flap valve elements as well as the effective biasing force of the hinge assembly, it is possible to produce many different flow characteristics in the valve assembly.

As is apparent from the foregoing, a primary object of the invention is the provision of a simple and highly effective variable rate flap valve assembly.

A still further object of the invention is the provision of a flap valve assembly which can have any number of individual valve elements each carried by a separate hinge and arranged to open at a different upstream pressure.

BRIEF DESCRIPTION OF THE DRAWINGS

The above and other objects and advantages will become apparent from the following description when read in conjunction with the accompanying drawings wherein:

FIG. 2 is a cross-sectional view taken on line 2—2 of FIG. 1; and,

FIG. 3 is a cross-sectional view taken on line 3—3 of FIG. 1.

DETAILED DESCRIPTION OF THE PREFERRED EMBODIMENT

Figure 1:
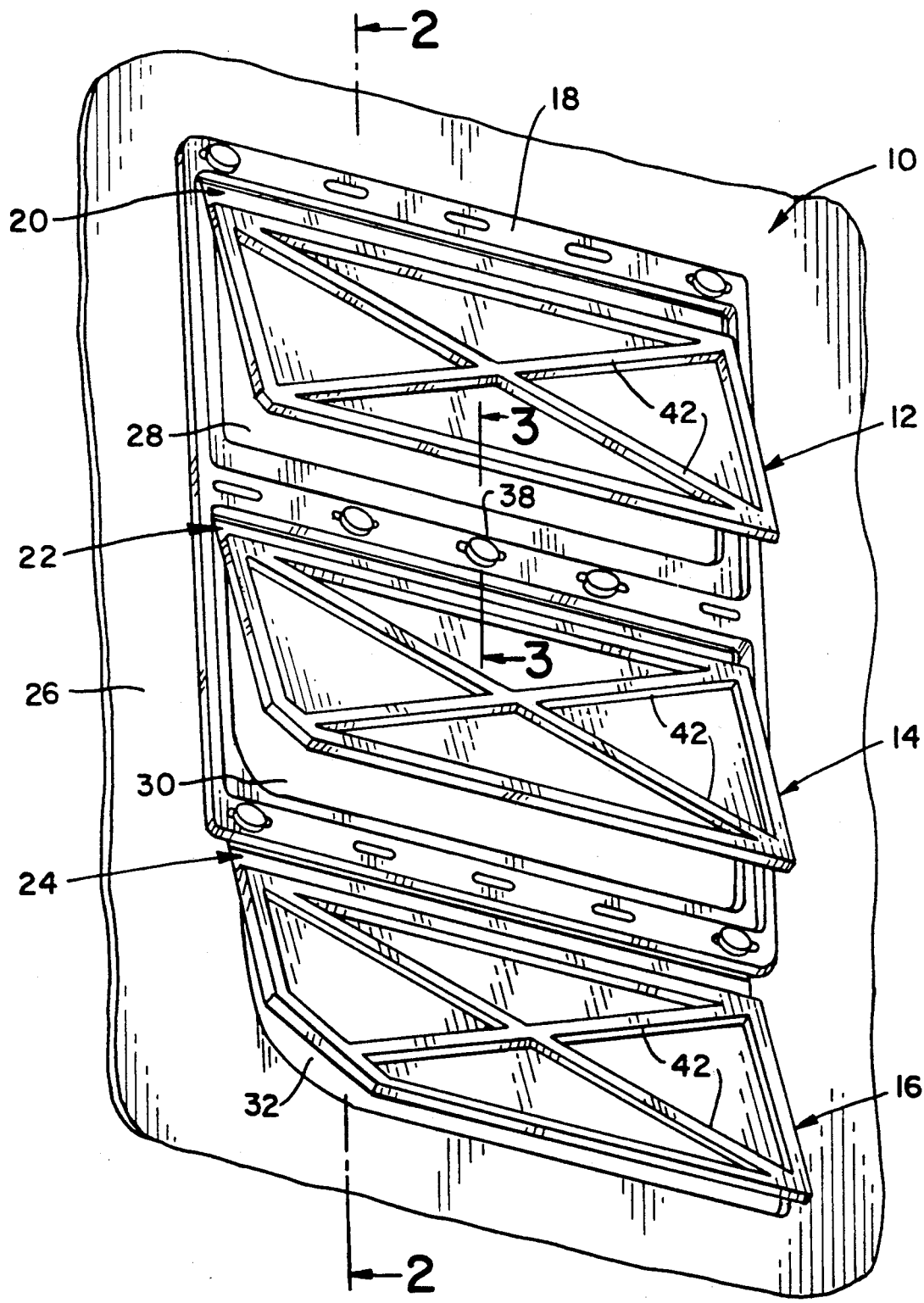
FIG. 1 is a pictorial view showing a flap valve assembly formed in accordance with the preferred embodiment of the invention.

Referring more particularly to the drawings wherein the showings are for the purpose of illustrating a preferred embodiment of the invention only and not for the purpose of limiting same, FIG. 1 shows the overall arrangement of a preferred form of the flap valve assembly 10 which is formed in accordance with the invention. As illustrated, the assembly is comprised of a plurality of individual flap valve elements 12, 14, and 16 suitably joined to a main frame assembly 18 by hinge assemblies 20, 22, and 24, respectively. Although the assembly is shown with three individual flap valve elements, it could have any desired number of such valves depending upon the air flow demands of the system or the operating characteristics desired.

In the subject embodiment, the main frame 18 is directly connected to a vehicle panel member 26 which is provided with air passages or openings 28, 30, and 32 which are respectively associated with the valve elements 12, 14, and 16. It should be noted that the openings 28, 30, and 32 are slightly smaller than the associated flap valve element, and the relationship is such that when the valve is in its lowered or closed position, it completely overlies the associated opening and prevents air flow therethrough. Here, again, it should be appreciated that the openings 28, 30, and 32 could be formed in a separate frame element independent of the vehicle panel member, and bonded or otherwise connected to both frame 18 and the vehicle panel.

It is preferable that the flap valve elements and the associated main frame 18 be formed as a single unitary unit from any suitable elastomeric material through an injection molding process. However, it is possible to form the assembly through other fabrication processes such as stamping or the like.

As best illustrated in FIGS. 2 and 3, the frame 18 is suitably connected to the base member 26 through the use of rivets or bolt members 38 as shown. If desired, however, a variety of different types of mechanical connectors, adhesives, or the like could be used to suitably hold the valve assembly in position relative to member 26.

The valve elements are positioned to lie on the downstream side of the openings 28, 30, and 32. They are joined with the frame 18 by hinge means such that in their normal position, they lie in the same plane as frame 18 and engage the surface of panel 26 closely about the peripheral edges of the flow openings 28, 30, and 32. The FIG. 1 showing illustrates the valve elements in a deflected or open position which allows air flow through the noted openings. FIGS. 2 and 3 illustrates the valve elements in their normal, closed position. According to the invention, the hinge means are designed so that with a pressure buildup on the upstream side in vehicle passenger compartment, the elements open to permit air flow from the compartment to the exterior side of the panel member 26. In the subject embodiment, the individual flap valve elements 12, 14, and 16 are connected to the associated frame 18 by hinge means defined by relatively thin webs of the elastomeric material from which the assembly is molded. As best illustrated in FIGS. 2 and 3, the hinge assemblies 20, 22, and 24 each comprise a relatively narrow and thin web which extends the full width of the individual flap valve elements. The individual flap valve elements 12, 14, and 16 are formed somewhat thicker to have a greater rigidity than the associated hinge assemblies. In this regard, they are shown as provided with reinforcing ribs which extend diagonally and are identified with the reference numeral 42. Additionally, each of the flap valves preferably has a peripheral reinforcing rib or edge piece 44 which acts to provide the necessary flap rigidity.

Of particular importance to the subject invention is the arrangement which allows a variable air flow through the flap valve assembly. That is, the assembly is arranged such that the number of the flap valve elements which open at any point in time is determined by the upstream air pressure. This is important in that a sudden increase in vehicle chamber pressure, such as results when door is slammed shut, should preferably be quickly vented without permitting a long term pressure buildup of any significance within the vehicle passenger compartment. In the subject invention, this variable rate air flow and pressure release is achieved by forming each of the hinge assemblies 20, 22, and 24 so as to have a differing resistance to opening. That is, each of the hinges biases its respective flap valve to a closed position with a different biasing force. In the subject device, this is achieved by making each of the hinge assemblies to have a different predetermined relative resistance to bending so that the stiffness of the web sections is varied by a predetermined amount. By using the web-type hinge assembly, this can be easily accomplished merely by varying the thickness of each of the individual hinges. In the embodiment under consideration, the hinge assemblies 20, 22, and 24 are progressively thicker such that the flap valve 12 opens under any low continuous pressure, whereas the valves 14 and 16 open only with progressively greater levels of pressure within the interior of the vehicle.

As is apparent from the foregoing, the subject invention provides an extremely simple and effective variable rate valve assembly.

While the invention has been described with reference to a preferred embodiment, it is apparent that variations and modifications will occur to others upon a reading and understanding of the subject specification. It is intended to include such variations and modifications as part of our invention insofar as they come within the scope of the claims.

Having thus described the invention, it is now claimed:

1. In a valve for use in ventilation of the passenger compartment of a motor vehicle and comprising a housing defining a plurality of through flow passages with separate flap valve elements pivotally mounted adjacent each through flow passage and adapted in a first position to overlie the associated through flow passage for blocking flow therethrough and when pivoted toward a second position permitting flow, the improvement wherein said separate flap valve elements are each pivotally mounted by separate hinge means which act to bias the valve elements toward the first position with a preselected force, the hinge means on separate ones of said flap valve elements providing different preselected biasing forces such that the number of valve elements moving toward the second position at any point in time depends upon the then current level of pressure of fluid on the upstream side of the valve.

2. A valve as defined in claim 1 wherein said hinge means comprise webs of elastomeric material.

3. A valve as defined in claim 2 wherein said webs of elastomeric material are of predetermined different thicknesses on different ones of said valve elements.

4. A valve as defined in claim 2 wherein said webs of elastomeric material are formed integrally with said flap valve elements.

5. A valve as defined in claim 2 wherein said webs of elastomeric material are directly connected to said housing.

6. A valve as defined in claim 1 wherein said flap valve elements are formed from elastomeric material integrally with said hinge means.

7. A valve as defined in claim 6 wherein said hinge means comprise thin webs of said elastomeric material which join said valve elements to said housing.

8. In a valve for use in ventilation of a motor vehicle and comprising a housing defining a plurality of through flow passages with separate flap valve elements mounted adjacent each through flow passage for assuming a first position for blocking flow therethrough in one direction and movable to an open position for permitting flow therethrough in the opposite direction, the improvement wherein each of the separate flap valve elements is pivotally mounted by separate hinge means which act to bias the valve elements toward the first position to resist movement to the open position, the hinge means on separate ones of the flap valve elements providing different preselected biasing forces such that the number of valve elements moving toward the open position at any point in time is dependent on the pressure of the fluid acting to move the valve elements toward the open position.

9. The valve as defined in claim 8 wherein said hinge means comprise webs of elastomeric material joined between the housing and each flap valve element.

10. The valve as defined in claim 9 wherein each flap valve element is formed from elastomeric material integral with the web joining the respective flap valve to the housing.

11. The valve as defined in claim 9 wherein each web is formed to have a different preselected resiliency.

12. The valve as defined in claim 11 wherein each web has a different preselected thickness.

13. The valve as defined in claim 10 wherein each web is formed with a different volume of material to provide a different biasing force.

* * * * *